United States Patent
Danzeisen et al.

(10) Patent No.: US 8,484,468 B2
(45) Date of Patent: Jul. 9, 2013

(54) PROCESS AND SYSTEM FOR SELECTABLE DATA TRANSMISSION

(75) Inventors: Marc Danzeisen, Ittigen (CH); Simon Winiker, Bern (CH); Jan Linder, Bern (CH); Florian Baumgartner, Bern (CH)

(73) Assignee: Swisscom AG, Bern (CH)

( * ) Notice: Subject to any disclaimer, the term of this patent is extended or adjusted under 35 U.S.C. 154(b) by 1016 days.

(21) Appl. No.: 11/774,621

(22) Filed: Jul. 9, 2007

(65) Prior Publication Data

US 2008/0052513 A1    Feb. 28, 2008

(30) Foreign Application Priority Data

Jul. 7, 2006   (EP) .................................... 06116806

(51) Int. Cl.
*H04L 29/06* (2006.01)

(52) U.S. Cl.
USPC ................. 713/168; 713/193; 726/2; 726/26; 726/27; 705/50

(58) Field of Classification Search
USPC .............. 713/168, 193; 726/2, 26, 27; 705/50
See application file for complete search history.

(56) References Cited

U.S. PATENT DOCUMENTS

| | | | | |
|---|---|---|---|---|
| 5,027,271 | A * | 6/1991 | Curley et al. ................. | 710/240 |
| 5,999,622 | A * | 12/1999 | Yasukawa et al. ............... | 705/51 |
| 7,068,640 | B2 * | 6/2006 | Kakemizu et al. ............ | 370/349 |
| 7,308,477 | B1 * | 12/2007 | Gress et al. .................... | 709/206 |
| 7,490,249 | B1 * | 2/2009 | Djakovic ...................... | 713/193 |
| 2002/0059629 | A1 * | 5/2002 | Markel ......................... | 725/100 |
| 2002/0097415 | A1 * | 7/2002 | Chang et al. ................. | 358/1.13 |
| 2002/0133595 | A1 * | 9/2002 | Kimura et al. ................ | 709/227 |
| 2003/0108205 | A1 * | 6/2003 | Joyner et al. .................. | 380/277 |
| 2004/0224678 | A1 * | 11/2004 | Dahod et al. ............... | 455/426.1 |
| 2006/0105748 | A1 * | 5/2006 | Ooi et al. .................... | 455/412.1 |
| 2006/0137015 | A1 * | 6/2006 | Fahrny et al. ................... | 726/26 |

(Continued)

FOREIGN PATENT DOCUMENTS

| | | |
|---|---|---|
| EP | 1 571 804 A2 | 7/2005 |
| WO | WO 01/11883 A1 | 2/2001 |
| WO | WO 2005/020541 A1 | 3/2005 |

OTHER PUBLICATIONS

U.S. Appl. No. 11/774,674, filed Jul. 9, 2007, Danzeisen et al.

(Continued)

*Primary Examiner* — Nathan Flynn
*Assistant Examiner* — Sarah Su
(74) *Attorney, Agent, or Firm* — McAndrews, Held & Malloy, Ltd.

(57) ABSTRACT

The present invention relates to a process and a system for selectable data transmission. Authentication data and an electronic key are generated, whereby the electronic key is stored as assigned to the authentication data. Data are encrypted into encrypted data by means of an encryption module of a central module and by means of at least part of the electronic key. A signaling message is transmitted to a first communications terminal. A second communications terminal is selected by means of the first communications terminal. On the identification of the selected second communications terminal, the encrypted data are transmitted to the second communications terminal. At least part of the electronic key is transmitted to the second communications terminal by means of an authentication module of the central module. The encrypted data are decrypted by means of a decryption module of the second communications terminal and by means of at least the part of the electronic key.

22 Claims, 4 Drawing Sheets

U.S. PATENT DOCUMENTS

| | | | |
|---|---|---|---|
| 2007/0087766 A1* | 4/2007 | Hardy et al. | 455/466 |
| 2007/0244822 A1* | 10/2007 | Hogan | 705/57 |
| 2008/0010216 A1* | 1/2008 | Danzeisen et al. | 705/71 |
| 2008/0019519 A1* | 1/2008 | Su et al. | 380/243 |
| 2008/0095080 A1* | 4/2008 | Danzeisen et al. | 370/277 |
| 2009/0055904 A1* | 2/2009 | Gomi et al. | 726/4 |
| 2009/0227272 A1* | 9/2009 | Danzeisen et al. | 455/466 |
| 2011/0154031 A1* | 6/2011 | Banerjee et al. | 713/165 |
| 2012/0254614 A1* | 10/2012 | Kimura et al. | 713/168 |

OTHER PUBLICATIONS

U.S. Appl. No. 13, 163,374, filed Jun. 17, 2011, Linder et al.

\* cited by examiner

PROCESS AND SYSTEM FOR SELECTABLE DATA TRANSMISSION

CROSS REFERENCE TO RELATED APPLICATIONS

This patent specification is based on European patent application, No. 06116806.8 filed on Jul. 7, 2006 in the European Patent Office, the entire contents of which are incorporated by reference herein.

BACKGROUND OF THE INVENTION

1. Field of the Invention

The present invention relates to a process and a system for selectable data transmission.

2. Description of the Related Art

In the state of the art, data that are present on a network, e.g. data stored on a network server, are often accessed from a terminal, e.g. from a computer of a user. Thus, a user can, for example, use a terminal in order to retrieve E-mail messages that are stored on an E-mail server. In the state of the art, various processes are known for the transmission of data between a server and a terminal. Processes are known that are particularly suitable for transmitting E-mail messages or current headlines. Processes are known for transmitting multimedia data, such as audio data or video data, from a network server to a terminal. Such processes can be based, for example, on protocols such as POP (Post Office protocol), IMAP (Internet Message Access Protocol), FTP (File Transfer Protocol), SMB (Server Message Block) or any other kind of protocol.

Before data are transmitted, a check can be made on whether a user is entitled to access the corresponding data. Before E-mail messages are accessed, or before an audio file is downloaded, for example, the identity of a user is checked, by means of a user name and a password, for example, or, in other words, authentication is carried out. Such authentication can also be based, for example, on the creation of a secured data connection, such as a VPN connection (VPN: Virtual Private Network). After the check on the identity of the user, corresponding data are transmitted to the terminal of the user, whereupon the data are available to the user on this terminal.

Depending on the nature of the data, however, and depending on the nature of the terminal, it can be problematic for the user to access the data. Special software may be required, for example, in order to access the data. Or it may be necessary for the terminal to possess specific features, such as a particularly powerful processor, a particularly high-resolution screen, particular input devices, such as a precise mouse or a joystick, or any other kind of input/output devices, in order to display or represent the data on the terminal. A user often possesses various terminals, e.g. a terminal at home, a mobile terminal, or a terminal at the workplace, whereby these terminals often also display different features in regard to network bandwidth, processor performance or screen resolution. After the user has carried out authentication with a terminal and is thus entitled to transmit specific data to the terminal, such as E-mail messages or video data, it would often be convenient for the user to select a particular terminal in order to transmit the data to that terminal. Thus, it can be convenient that an E-mail message with a video file is better transmitted to the terminal at home or that an E-mail message with a presentation is better transmitted to the terminal at the workplace. In order to carry out such a transmission of the data in the state of the art, the user must carry out authentication with the appropriate terminal and then initiate the transmission of the data to the terminal. In the state of the art, data are downloaded by the user to the same terminal on which the representation of the data also takes place.

In the state of the art, for the reasons mentioned, the transmission of data from a server to a terminal of a user, for example, suffers from various disadvantages. A user could, of course, initially download data to a terminal on which the user is working at the time, and then retransmit the data to a preferred terminal. Such a transmission is complicated, however, and is not feasible at all under some circumstances, for example, because of a lack of capacity of the network interface of the terminal, such as, for example, the capacity of the network interface of a mobile terminal. Without additional authentication mechanisms, moreover, the data transmitted to the preferred terminal could easily be looked at by a third party who was using that terminal at the time.

The document WO 2005/020541 discloses a method for the secure transfer of content from a content server to a content consumer. A content requester sends instructions so that a content access code is transmitted to the content consumer. On the basis of the content access code, a request is sent by the content server for the encryption of content and for the downloading of the encrypted content to the content server.

The document WO 01/11883 discloses a method for the safe circulation of content. A content provider provides content to a service provider. The service provider provides the content to at least one content consumer. A confidence-based relationship can exist between the content provider and the service provider, as well as between the service provider and at least one content consumer, so that the content is protected both during transmission and during reception within a broadcast or multicast network.

SUMMARY OF THE INVENTION

The present inventions include a new process and a new system for selectable data transmission which overcome the disadvantages of the prior art.

According to the present inventions, these objectives are achieved in particular by the elements of the independent claims. In addition, further advantageous embodiments emerge from the dependent claims and the description.

These objectives are achieved by the present inventions in particular by the fact that authentication data and an electronic key are generated, whereby the electronic key is stored as assigned to the authentication data, that data are encrypted by means of an encryption module of a central module and by means of at least part of the electronic key, that by means of a transmission module of the central module a signaling message is transmitted to a first communications terminal, that by means of the first communications terminal a second communications terminal is selected, whereby an identification of the selected second communications terminal is transmitted to the transmission module of the central module, that the encrypted data are transmitted by the transmission module of the central module to the second communications terminal based on the identification of the selected second communications terminal, that on the basis of a transmission of authentication data between the first and/or the second and/or a third communications terminal and an authentication module of the central module, at least part of the electronic key is transmitted to the second communications terminal, and that by means of a decryption module of the second communications terminal and by means of at least part of the electronic key, the encrypted data are decrypted. Such a process has the particular advantage that a selectable data transmission can be carried out, whereby a user can select the communications terminal to which data are to be transmitted, and whereby it is ensured that only authorized persons can access the transmitted data. Such a selectable data transmission can also refer, for example, to a transmission of a video stream or to a video call, so that, for example, the user on the first communications terminal receives the notification that data concerning a video stream is ready, that the user by means of the first communications terminal selects a second communications terminal, that the encrypted video stream is forwarded to the second communications terminal, that by means of the first or second communications terminal authentication is carried out, and that the electronic key for decrypting the video stream is transmitted to the second communications terminal.

In one embodiment of the present invention, the electronic key is generated based on the identification of the second communications terminal transmitted to the transmission module of the central module, and/or an encryption algorithm of the encryption module is selected based on the identification transmitted to the transmission module of the central module. The encryption module can have a number of different encryption algorithms at its disposal. Depending on the electronic key generated, an encryption algorithm suitable for this key can be used. Or, depending on the identification of the second communications terminal, an encryption algorithm particularly well adapted to this communications terminal can be selected. A different electronic key can be used, depending on the second communications terminal. If, for example, the second communications terminal is a computer in a firm, an electronic key can be used that provides a high degree of security. Or if, for example, the second communications terminal is a mobile computer, an electronic key can be used that enables efficient decryption. Such a process has the particular advantage that the encrypted data can be adapted to the second communications terminal.

In another embodiment of the present invention, at least part of the electronic key is transmitted over a communications link between the central module and the first communications terminal and over a communications link between the first communications terminal and the second communications terminal. This embodiment is sensible, for example, if the first communications terminal is a mobile radio terminal that can be logged in and authenticated on a mobile radio network. The electronic key can be transmitted to the mobile radio terminal of the user, for example, after the user has selected a second communications terminal with the mobile radio terminal and after the data have been encrypted. The encrypted data can then be transmitted to the second communications terminal. As soon as the user wishes to access the encrypted data with the second communications terminal, the electronic key can be transmitted from the mobile radio terminal to the second communications terminal, for example, over a wireless communications link between the mobile radio device and the second communications terminal. Such a process has the particular advantage that the electronic key for decrypting the encrypted data always remains under the control of the user and is easily available to the user.

In one embodiment of the present invention, a user profile is stored in the central module, whereby data are encrypted in accordance with the user profile. It can be stored in the user profile that, for example, the latest order information for a product or the latest E-mail messages for the user are encrypted, whereby a corresponding signaling message is then transmitted to a first communications terminal of the user. Such a process has the particular advantage that the encryption and transmission of data can be automated in accordance with the guidelines of the user.

In another embodiment of the present invention, the availability of the second communications terminal is checked by means of an availability module of the central module and, if the second communications terminal is available, the encrypted data are transmitted to the second communications terminal. In this context, availability can mean that a network interface of the second communications terminal is ready to receive. Availability can however also mean that, as a consequence of overloading of the capacity of the corresponding networks, the communications link between the transmission module and the second communications terminal is classified as not available. Such a process has the particular advantage that the encrypted data can be transmitted to the second communications terminal at the earliest possible time or when the utilization of network capacity is at a definable level.

In another embodiment of the present invention, the encrypted data can be transmitted to a network device of a network infrastructure, whereby the encrypted data are stored on the network device, and are transmitted asynchronously by the network device to the second communications terminal. Thus, the network device can refer, for example, to a network storage device of a private ADSL connection of a residence, connected to an ADSL modem. In this process, the ADSL modem and the network storage device remain permanently switched on and the encrypted data can thus be transmitted to the network storage device over the ADSL connection at any time. As soon as the user switches on his computer at home, the encrypted data stored on the network storage device can be transmitted to the computer of the user. Or at a public location, such as a railway station with a WLAN access point that has at its disposal an air interface with a bandwidth of many Mbit/s, but is connected to a network infrastructure over a data line with only few Mbit/s, large quantities of encrypted data can be transmitted to the WLAN access point at night and temporarily stored, for example. As soon as the user passes the WLAN access point at the railway station in the morning, encrypted data can be transmitted over the powerful air interface to a mobile computer of the user. Such a process has the particular advantage that the capacity utilization of network infrastructures can be optimized. So the transmission of encrypted data over an ADSL connection can take place in the afternoon, for example, at a time when as yet only few private users are using the network infrastructure of an Internet provider. A local network in a residence normally has a much higher bandwidth than an ADSL connection. The transmission from the network memory to the computer of the user takes a correspondingly much shorter time than a transmission over an ADSL connection. For the case described of a WLAN access point, similar advantages result.

In another embodiment of the present invention, a user account is debited with a monetary value upon the transfer of at least part of the electronic key. Such a process has the particular advantage that chargeable services, such as the provision of audio or video files, or any other file, or any other service, such as the intermediate storage of data, the administration of data, or any other service, can be offered to the user by means of the transmission of encrypted data.

In a further embodiment of the present invention, the encrypted data include a program code that must be executed in order to decrypt the encrypted data, while validation criteria are checked during the execution of the program code. The program code can, for example, be of such form that the validity of the key is checked with reference to a time measurement, to a central server with which the validity of keys is monitored, or in accordance with any other process. Such a process has the particular advantage that, for example, a time can be defined after which the encrypted data are no longer available. Such a process moreover guarantees compatibility with processes known from DRM (DRM: Digital Rights Management).

In another embodiment of the present invention, an identification is assigned to the data and/or to the encrypted data, and the authentication data are stored as assigned to the identification. Such an identification can, for example, be formed as the result of a hash function of the encrypted data. Such a process has the particular advantage that authentication for access to the encrypted data can also be of different forms with reference to the encrypted data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
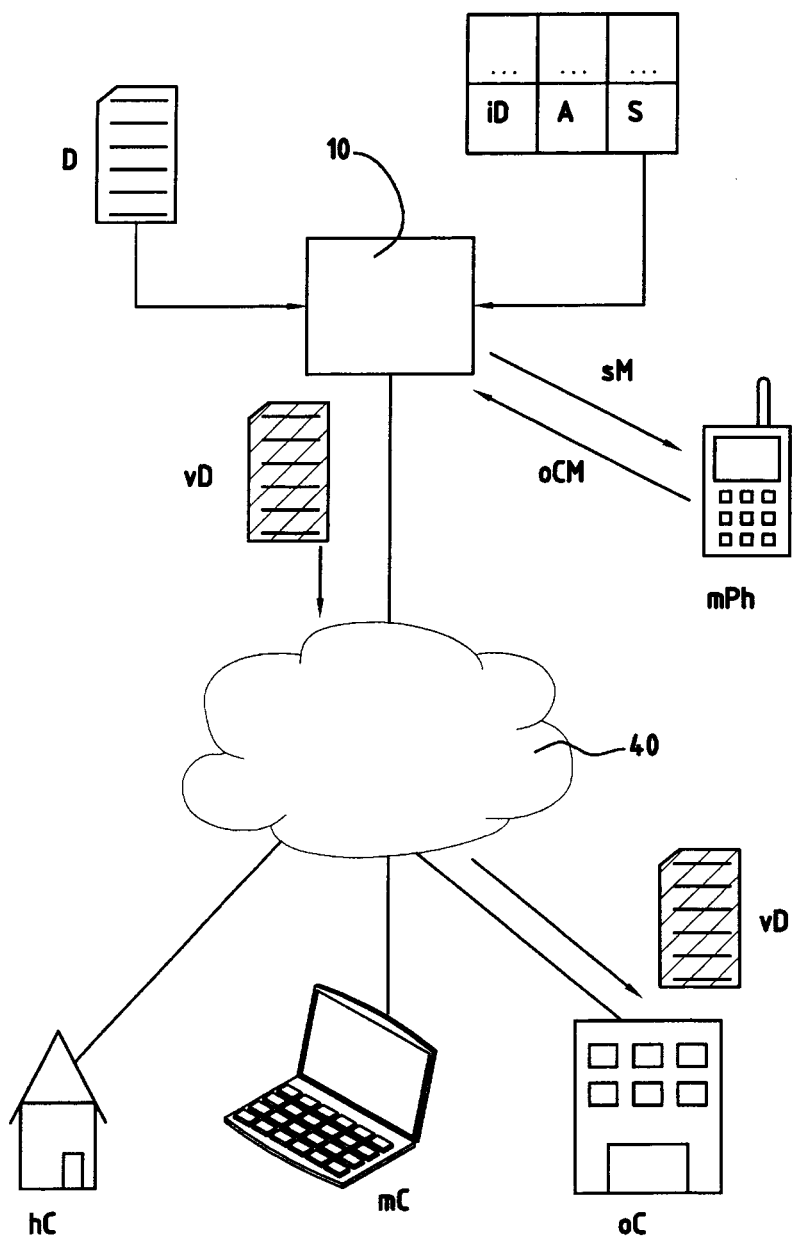
FIG. 1 shows a block diagram with the individual components for the encryption of data and for selectable transfer of the encrypted data.

Referring now to the drawings, wherein like reference numerals designate identical or corresponding parts throughout the several views.

In FIG. 1, the reference mark 10 refers to a central module. The central module 10 can, for example, be formed as a software module of a network server. The central module 10 can also, of course, be formed completely as a hardware module with appropriate electronic circuits. In FIG. 1, the reference mark D refers to electronic data. The data D can be electronic data of any kind, for example E-mail messages, texts, animations, audio files, video files, or electronic data of any other kind. In FIG. 1, the reference mark A refers to authentication data and the reference mark S refers to an electronic key. The authentication data A can, for example, include a user name and a password or pass phrase. The electronic key S can, for example, include a symmetrical electronic key with a secret key or an asymmetrical electronic key with a public key and a private key. The authentication data A are stored as assigned to the electronic key S while, for example, the central module 10 includes a corresponding table. The authentication data A and the electronic key S can moreover be stored as assigned to an identification iD of the data, so that the authentication data A and the electronic key S are valid only with reference to data that can be identified by the identification iD of the data. Corresponding tables can of course also be provided for in the central module 10 with reference to the identification iD of the data. Data D can be encrypted by means of the electronic key S and an encryption module of the central module 10. Such encryption can refer to any encryption algorithm, for example a DES algorithm (DES: Data Encryption Standard), a PGP algorithm (PGP: Pretty Good Privacy), an IDEA algorithm (IDEA: International Data Encryption Algorithm), or any other encryption algorithm. Encrypted data vD are generated by the encryption of the data D.

In FIG. 1, the reference mark mPh relates to a first communications terminal. The first communications terminal can be a mobile radio telephone, a mobile computer, or any other communications terminal. In FIG. 1, the reference mark sM relates to a signaling message. The signaling message can be a message in accordance with the SMS standard (SMS: Short Message Service), the USSD standard (USSD: Unstructured Supplementary Service Data), the SS7 standard (SS7: signaling system #7), the SIP standard (SIP: Session Initiation Protocol) or any other standard or any other format. The availability of data D or of encrypted data vD is signaled to the first communications terminal mPh with the signaling message sM. The signaling message sM can be transmitted to the first communications terminal mPh over any communications network, for example, over a mobile radio network, over a wireless mobile radio network, over a wire-based data network such as an Ethernet network, or over any other communications network. So the signaling message sM can include information relating to the availability of E-mail messages, audio data, video data, or any other kind of data. Such information can concern, for example, the title, the sender, the author, the subject line, or any other kind of information for the identification of data D or for the identification of encrypted data vD. The signaling message sM can be interpreted on the first communications device mPh, and corresponding information about the availability of data or of encrypted data can be notified to the user on a display of the first communications terminal. Information relating to second communications terminals hC,mC,oC can be notified on the display at the same time. Information relating to second communications terminals hC,mC,oC can be transmitted to the first communications terminal mPh together with the signaling message sM, or this information can have been stored in advance on the first communications terminal mPh. A second communications terminal hC,mC,oC can, for example, be a computer, such as a notebook or a PDA (PDA: Personal Digital Assistant), a mobile telephone, a games console, a permanently installed computer, or any other communications terminal. The designation hC relates, for example, to a computer of the user at home, the designation mC relates, for example, to a mobile computer of the user, and the designation oC designates, for example, a computer in an office at a workplace of the user. The user can select one of the second communications terminals hC,mC,oC, the second communications terminal oC, for example, by means of an input device of the first communications terminal, a keyboard, a mouse, a joystick, for example, or any other input device. An appropriate message oCM can be transmitted to the central module 10 by means of a transmission module of the first communications terminal mPh. Such a message can be interpreted by a transmission module of the central module 10, and the encrypted data vD can then be transmitted to the corresponding second communications terminal oC by means of the transmission module of the central module 10. However, printers, beamers, or devices of any other kind, which for example are not in the possession of the user and are used by the user only temporarily, during a presentation, for example, can also be used as a second communications terminal. Thus, by means of the appropriate selection by the first communications terminal mPh, a presentation can be transmitted as encrypted data vD to a computer that is assigned to a beamer. As soon as the user wishes to start the presentation, the presentation can be decrypted and presented with the beamer by a corresponding transmission of the key S. Such a process guarantees that all the data are available at the start of the presentation, and that the data are only accessible to the authorized user, in particular without the user having to take with him a mobile computer of his own. Such a transmission of a presentation to a computer assigned to a beamer is of interest, in particular, for very large quantities of data, such as a video file.

In FIG. 1, the reference mark 40 refers to a communications network. The communications network can, for example, refer to the Internet and can be constructed from various networks of differing technologies. Thus, the communications network can include GSM networks, UMTS networks, WLAN networks, Ethernet networks, UWB networks, or networks of any other kind. As shown in FIG. 1, the central module 10 and the second communications terminal hC,mC,oC can be connected in particular to the communications network 40. The transmission as described of encrypted data vD to a second communications terminal hC,mC,oC is enabled by means of the communications network 40. There are the widest variety of options in order thus to store data D as encrypted data vD on the second communications terminal hC,mC,oC. E-mail messages, texts, animations, audio files, video files or data of any other kind can be stored on the second communications terminal hC,mC,oC as encrypted E-mail messages, encrypted texts, encrypted animations, encrypted audio files, or encrypted video files. It is, however, the case that the encrypted data vD may still be useless, since for the time being the key to decrypt the encrypted data is stored only on the central module 10.

The transmission of the signaling message sM to the first communications terminal mPh and/or the transmission of the encrypted data vD to the second communications terminal hC,mC,oC can take place at any favorable time. A favorable time can refer to the arrival of new E-mail messages, the availability of texts, or the publication of a new audio file. A favorable time, however, can also refer to the availability of a communications link between the communications network 40 and the second communications terminal hC,mC,oC, the capacity utilization of the communications network 40, the capacity utilization of parts of the communications network 40, a time that occurs due to an input from the user on one of the communications terminals, or any other time.

The transmission of the encrypted data vD can also take place in accordance with various scenarios. One scenario can be that the encrypted data vD are transmitted to the second communications terminal hC,mC,oC at any time during the night over a broadband communications link, such as an Ethernet connection. Such a scenario may be selected, for example, in order to transmit a very large encrypted video file, of an order of magnitude of 5 Gbytes, for example, to the second communications terminal hC,mC,oC. Or, in another scenario, encrypted data may be transmitted to the second communications terminal mC as soon as the user with this communications terminal mC comes into the range of a wireless communications network, such as a WLAN network or UWB network at a railway station or on the site of an airport. Such a scenario may be selected, for example, in order to transmit encrypted E-mail messages or encrypted texts to a user's second communications terminal mC before he boards a train. Depending on the network infrastructure, the channel between the second communications terminal and the wireless communications network has a much higher bandwidth than the channel between the wireless communications network and the backbone of the service provider. Although data could admittedly be received at high speed by the second communications terminal, the channel to the backbone can lead to a severe restriction on the reception rate. For such a scenario, it is advantageous to transmit encrypted data from the backbone to an intermediate storage device arranged in the wireless communications network ahead of time, during the night, for example. As soon as the second communications terminal mC is brought into the range of the wireless communications network, in the morning, for example, large quantities of encrypted data can be transmitted to the second communications terminal in little time, over a UWB network in particular. It may be remarked here that encrypted texts may refer, for example, to the current electronic issue of a daily newspaper.

Depending on the application, the features that the second communications terminal hC,mC,oC has at its disposal are already known at the time of encryption. Thus, the second communications terminal can refer, for example, to a mobile computer with a customary VGA screen resolution of 1024× 768 pixels. For such a second communications terminal hC,mC,oC, it makes no sense to provide a video file in much higher screen resolution, for example. Correspondingly, before the encryption of the data by means of the key S, a transformation of the data D can be carried out so that the data D are already better adapted to the second communications terminal on which the data are to be presented. Such a transformation of the data can only be carried out of course if corresponding information is available about the second communications terminal. Such information can, for example, be stored in a user profile.

Figure 2:
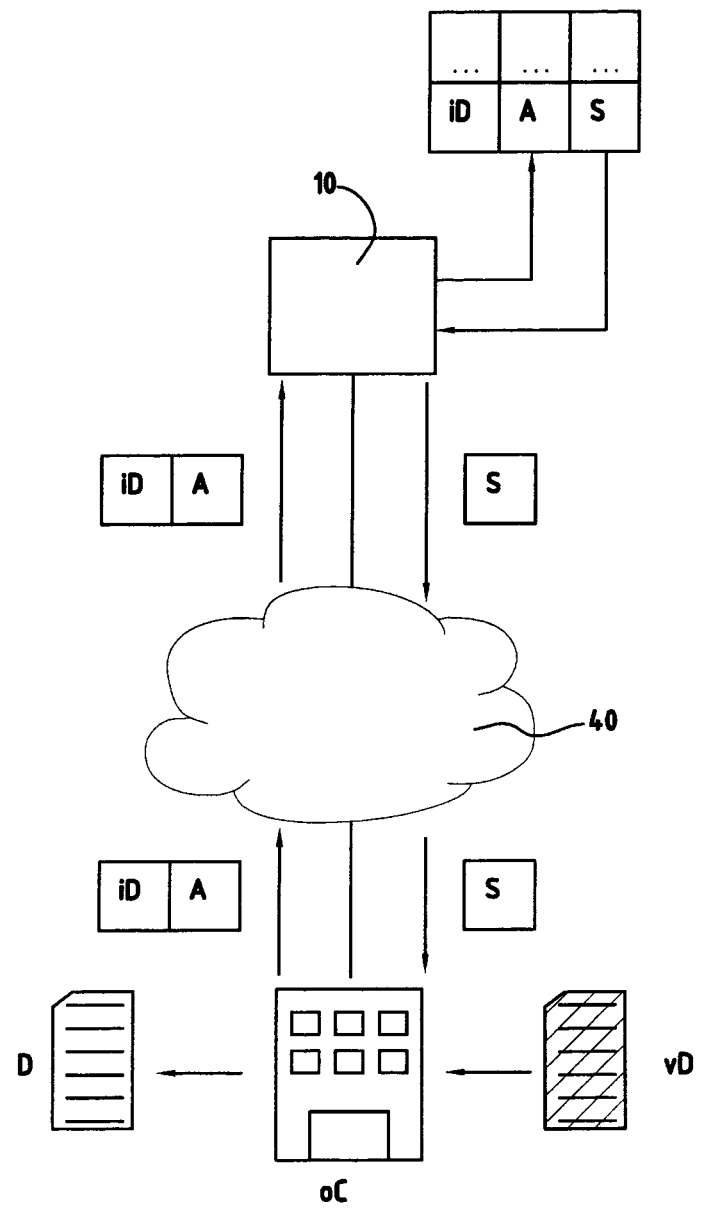
FIG. 2 shows a block diagram of the individual components for the authentication and decryption of the encrypted data.

In FIG. 2, the reference marks introduced in FIG. 1 are retained. As shown in FIG. 2, authentication data A are transmitted from the second communications terminal hC,mC,oC to the central module 10. The case using the second communications terminal oC is outlined in FIG. 2. Entitlement is thus authenticated with the electronic key S. At least parts of the electronic key S are then transmitted by the central module 10 to the second communications terminal hC,mC,oC. By means of the electronic key S, the encrypted data vD stored on the communications terminal can be decrypted and stored as data D on the communications terminal, whereby that the user can access the data D.

An authentication of entitlement with the electronic key S can take place in accordance with known processes. Such processes can take place on the basis of a password or pass phrases, by means of a SecureID card (SecureID: authentication process of the firm RSA Security), on the basis of the acquisition of biometric characteristics, or on any other basis that provides proof of entitlement.

Figure 3:
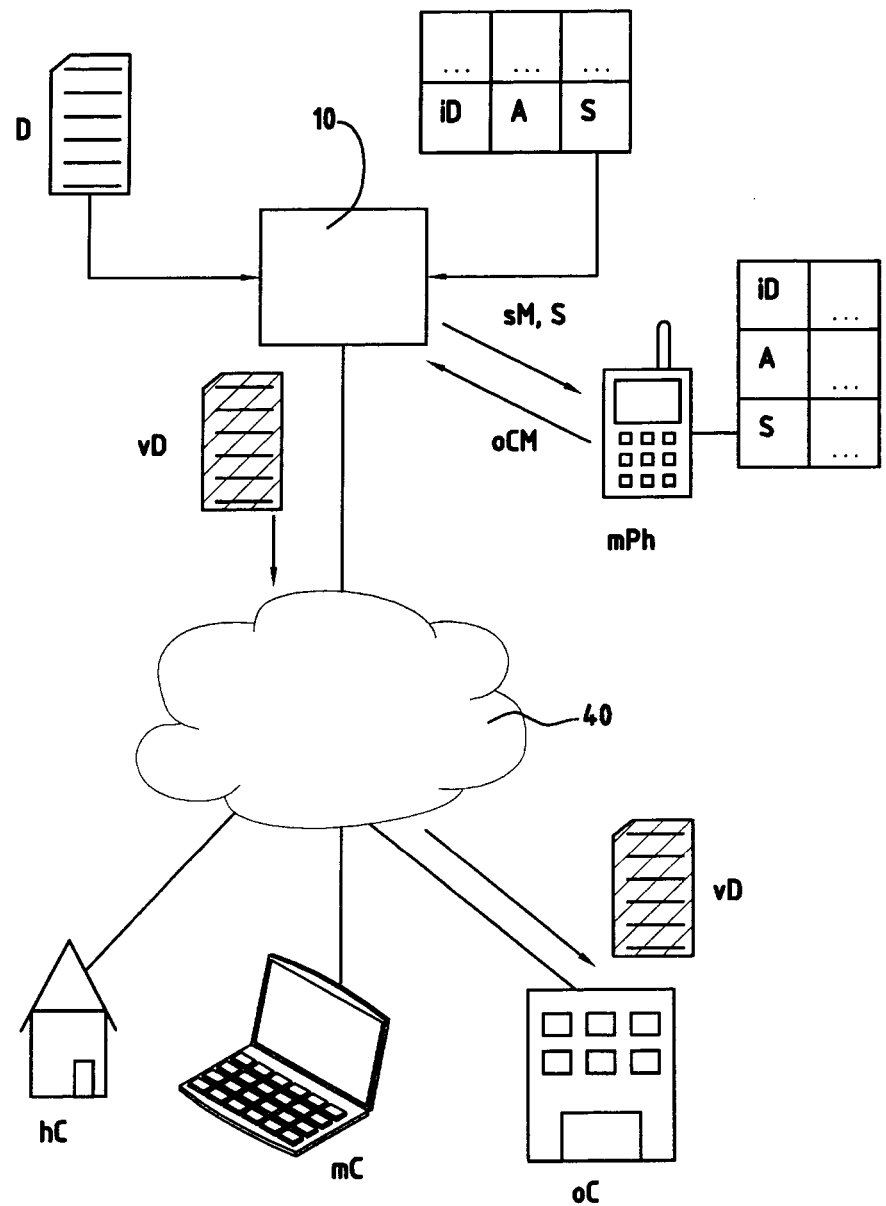
FIG. 3 shows a block diagram as in FIG. 1, whereby a key S is transmitted to a second communications terminal mPh.
Figure 4:
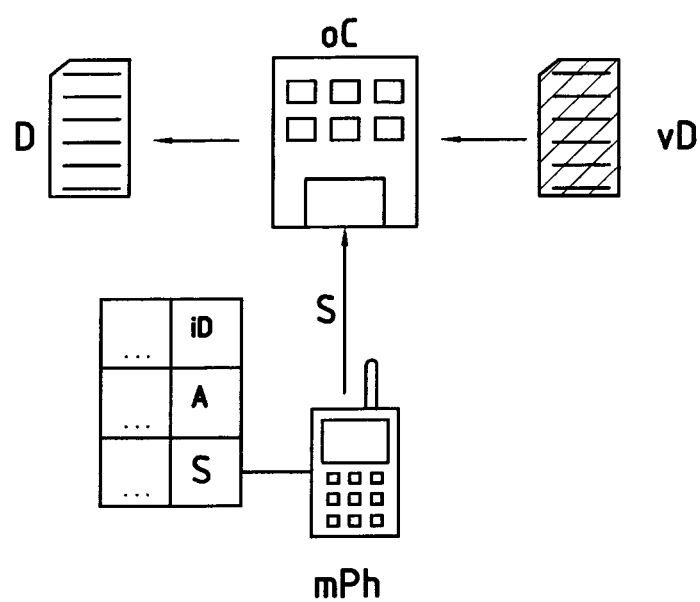
FIG. 4 shows a block diagram as in FIG. 2, whereby the key S is transmitted by the second communications terminal mPh to a first communications terminal oC.

Alternatively, the electronic key S can be transmitted to the second communications terminal hC,mC,oC, as shown in FIG. 3 and FIG. 4. As soon as the data D is encrypted into encrypted data vD, the key S used for this purpose can be transmitted to the first communications terminal mPh. This is particularly sensible if the first communications terminal mPh is a mobile radio terminal logged in on a mobile radio network and thus authenticated. The electronic key S is available to the user of the mobile radio terminal. The encrypted data are then transmitted to a second communications terminal hC,mC,oC in accordance with the selection made by the user. As soon as the user uses the corresponding second communications terminal, the key S can be transmitted from the mobile radio terminal to the second communications terminal hC,mC,oC over a local wireless connection, for example, a Bluetooth connection, for example, or any other local connection between the mobile radio terminal and the second communications terminal hC,mC,oC, whereupon the encrypted data vD stored on the second communications terminal hC,mC,oC can be decrypted into data D, and whereupon the user can access the data D by means of the second communications terminal hC,mC,oC.

As indicated in FIGS. 1 to 4 by the dotted fields, the identification iD, the authentication data A, and the key S can be stored in a table with such tuples. Different tuples can also be used for different applications. Thus, a first tuple may, for example, be used to encrypt video data, such as the latest hit films, for a particular second terminal device, such as a home computer of a user. Or a second tuple can be used to encrypt the same video data for a mobile computer of the user. Thus, the same identification iD and the same authentication data can admittedly be used. On the other hand, the key S can be selected as adapted to the respective terminal device, so that a key with, for example, different security requirements can be used in each case for the home computer and for the mobile computer.

The user profiles mentioned can be of such form that they are respectively tracked dynamically by the first communications device mPh. Thus, when a second communications terminal hC,mC,oC is selected, the user profiles are dynamically tracked in such a way that, if a signaling message sM refers to the same or similar data, the same or a similar second communications terminal hC,mC,oC is selected in each case for the transmission of encrypted data vD. By means of such a user profile, it can in particular be defined for specific data D which preparation of the data D should take place, which key S should be used, and to which second communications terminal hC,mC,oC the encrypted data vD should be transmitted, for example, in the absence of an appropriate identification by the first communications terminal mPh.

The previously described process may be encoded in software on a computer readable medium including a compact disk, memory device, flash memory or any other computer readable physical medium. The software is configured to cause a processor-based device to carry out one or more of the steps described above. Computer operations are described in "How Computers Work, Millennium Edition," by Ron White, Que Publications, 1999, the entire contents of which being incorporated herein by reference.

Obviously, numerous modifications and variations of the present inventions are possible in light of the above teachings. It is therefore to be understood that within the scope of the appended claims, the inventions may be practiced otherwise than as specifically described herein.

What is claimed is:

1. A method for selectable data transmission, comprising:
   assigning in a central module an electronic key to authenticated data associated with particular user;
   encrypting electronic data into encrypted data in the central module, using at least part of the electronic key;
   transmitting a signaling message, that indicates availability of the encrypted data or the electronic data, to a first communications terminal by the central module based on the encrypted data to cause the first communications terminal to select a second communications terminal from among a plurality of second communications terminals, whereby an identification of the selected second communications terminal is transmitted to the central module;
   transmitting the encrypted data by the central module to the second communications terminal based on the identification of the selected second communications terminal;
   transmitting at least part of the electronic key to the second communications terminal based on a prior transmission of the authentication data between the central module and one or more of the first communications terminal, the second communications terminal, and a third communications terminal to cause decrypting the encrypted data by a decryption module of the second communications terminal using the at least the part of the electronic key.

2. The method in accordance with claim 1, comprising: generating the electronic key based on the identification of the second communications device transmitted to the central module, and/or that an encryption algorithm is selected on the basis of the identification of the second communications device transmitted to the central module.

3. The method in accordance with claim 1, wherein at least one part of the electronic key is transmitted over a communications link between the central module and the first communications terminal as well as over a communications link between the first communications terminal and the second communications terminal.

4. The method in accordance with claim 1, comprising: storing a user profile in the central module, whereby the electronic data are encrypted in accordance with encryption information specified in the user profile and the encrypted data are transmitted to the second communications terminal specified in the user profile.

5. The method in accordance with claim 1, comprising: checking availability of the second communications terminal by the central module and if the second communications terminal is determined to be available, the encrypted data are transmitted to the second communications terminal as soon as possible.

6. The method in accordance with claim 1, comprising: transmitting the encrypted data to a network device of a network infrastructure, whereby the encrypted data are stored on the network device and are asynchronously transmitted to the second communications terminal by the network device.

7. The method in accordance with claim 1, comprising: debiting a user account with a monetary value upon the transfer of at least part of the electronic key.

8. The method in accordance with claim 1, wherein validation criteria are checked during the execution of program code in the encrypted data.

9. The method in accordance with claim 1, comprising: assigning an identification to the electronic data and/or to the encrypted data and storing the authentication data as assigned to the identification.

10. The method in accordance with claim 1, wherein prior to the encrypting of the electronic data with the electronic key, transforming the electronic data in the central module to be optimized for display on the selected second communications terminal.

11. The method in accordance with claim 10, wherein display resolution of the electronic data is transformed based on a display screen resolution of the selected second communications terminal stored in a user profile.

12. The method in accordance with claim 1, wherein prior to the encrypting the electronic data with the electronic key, transforming the electronic data in the central module to be better adapted to the second communications terminal the electronic data are to be sent.

13. A system for selectable data transmission, the system comprising:
   a central module, the central module being operable to:
      assign an electronic key to authenticated data associated with particular user;
      encrypt electronic data into encrypted data, using at least part of the electronic key;
      transmit a signaling message, that indicates availability of the encrypted data or the electronic data, to a first communications terminal on the basis of the encrypted data to cause the first communications terminal to select a second communications terminal from among a plurality of second communications terminals, whereby an identification of the selected second communications terminal is transmitted to the central module;

transmit the encrypted data to the second communications terminal based on the identification of the selected second communications terminal;

transmit at least part of the electronic key to the second communications terminal on the basis of a prior transmission of the authentication data between the central module and one or more of the first communications terminal, the second communications terminal, and a third communications terminal, to cause the second communications terminal to decrypt the encrypted data using at least the part of the electronic key.

14. The system in accordance with claim 13, wherein the electronic key is generated based on the identification of the second communications terminal transmitted to the central module, and/or that an encryption algorithm is selected based on the identification of the second communications terminal transmitted to the central module.

15. The system in accordance with claim 13, wherein at least the part of the electronic key is transmitted over a communications link between the central module and the first communications terminal and over a communications link between the first communications terminal and the second communications terminal.

16. The system in accordance with claim 13, wherein a user profile is stored in the central module, whereby the electronic data are encrypted in accordance with encryption information specified in the user profile and the encrypted data is transmitted to the second communications terminal specified in the user profile.

17. The system in accordance with claim 13, comprising: an availability module of the central module is configured to check availability of the second communications terminal, whereby, if the second communications terminal is determined to be available, the encrypted data are transmitted to the second communications terminal as soon as possible.

18. The system in accordance with claim 13, wherein the encrypted data are transmitted to a network device of a network infrastructure, whereby the encrypted data are stored on the network device and can be transmitted asynchronously by the network device to the second communications terminal.

19. The system in accordance with claim 13, wherein a user account is debited with a monetary value upon the transfer of at least part of the electronic key.

20. The system in accordance with claim 13, wherein validation criteria is checked during the execution of program code in the encrypted data.

21. The system in accordance with claim 13, wherein an identification is assigned to the electronic data and/or to the encrypted data and that the authentication data are stored as assigned to the identification.

22. A non-transitory computer readable storage medium, storing computer executable instructions which cause a processor-based device to execute a data transmission method comprising:

assigning in a central module an electronic key to authenticated data associated with particular user;

encrypting electronic data into encrypted data in the central module, using at least part of the electronic key;

transmitting a signaling message, that indicates availability of the encrypted data or the electronic data, to a first communications terminal by the central module based on the encrypted data to cause the first communication terminal to select a second communications terminal from among a plurality of second communications terminals, whereby an identification of the selected second communications terminal is transmitted to the central module;

transmitting the encrypted data by the central module to the second communications terminal based on the identification of the selected second communications terminal;

transmitting at least part of the electronic key to the second communications terminal based on a prior transmission of the authentication data between the central module and one or more of the first communications terminal, the second communications terminal, and a third communications terminal to cause decrypting the encrypted data by a decryption module of the second communications terminal using the at least the part of the electronic key.

* * * * *

UNITED STATES PATENT AND TRADEMARK OFFICE
CERTIFICATE OF CORRECTION

| | | Page 1 of 1 |
|---|---|---|
| PATENT NO. | : 8,484,468 B2 | |
| APPLICATION NO. | : 11/774621 | |
| DATED | : July 9, 2013 | |
| INVENTOR(S) | : Danzeisen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1015 days.

Signed and Sealed this
Twenty-seventh Day of January, 2015

Michelle K. Lee
*Deputy Director of the United States Patent and Trademark Office*